Dec. 25, 1956     R. W. WAMPLER     2,775,028

METHOD OF SEALING MULTIPLE SHEET GLAZING UNITS

Filed Aug. 23, 1952

Inventor
Roy W. Wampler
By Nobbe & Swope
Attorneys

United States Patent Office 2,775,028
Patented Dec. 25, 1956

2,775,028

METHOD OF SEALING MULTIPLE SHEET GLAZING UNITS

Roy W. Wampler, Toledo, Ohio, assignor to Libbey-Owens-Ford Glass Company, Toledo, Ohio, a corporation of Ohio Application August 23, 1952, Serial No. 305,945

3 Claims. (Cl. 29—455)

This invention relates broadly to multiple sheet glazing units. More particularly, it relates to preparing such units to withstand high altitudes.

Multiple sheet glazing units may be defined as comprising two or more sheets of glass which are held in spaced relation by separator strips of metal or other substantially impervious materials between the margins thereof. These strips are placed entirely around said margins and are permanently bonded thereto to provide hermetically sealed dead air spaces between said sheets.

To provide the units with the desired condensation preventing and insulating qualities, the dead air space may be dehydrated in any suitable manner. For example, access may be gained to the air space through an opening in the metal separator strip and dry air forced into said space, after which the opening may be permanently sealed. According to one method, the opening is sealed with solder using a special type soldering iron. In any case, however, known methods of sealing the dehydration opening are operations requiring special apparatus and/or skilled personnel.

In assembling the units, all of the operations above noted are normally performed at atmospheric pressure. Thus, when the units are installed in an altitude considerably greater than that of the assembling point, in many cases the difference in the pressure of the air within the units and that of the atmosphere at the higher altitude is found to cause outward bowing of the glass sheets and distortion of the unit as a whole. Similar problems arise during transportation of the units over areas of high altitude, such as found in many of the Western states.

It is, therefore, an object of this invention to provide a means of preparing multiple sheet glazing units to withstand high altitudes.

Another object of this invention is to provide a procedure for preventing the distortion of multiple sheet glazing units when installed in or transported over high altitudes.

Another object of this invention is to provide a simple method for establishing a pressure equilibrium between the dead air space within a multiple sheet glazing unit and the surrounding atmosphere.

Another object of this invention is to provide a method for venting and subsequently sealing an opening in a multiple sheet glazing unit at the point of installation.

Still another object of this invention is to provide a method of sealing an opening through a metal separator strip of a multiple sheet glazing unit which may be performed by a relatively unskilled operator.

Still another object of this invention is to provide a multiple sheet glazing unit which may be assembled at atmospheric pressure and installed at high altitudes without distortion thereof.

Still another object of this invention is to provide a water vapor tight seal for an opening through a metal separator strip of a multiple sheet glazing unit, which seal may be applied in the "field."

Other objects and advantages of the invention will become more apparent during the course of the following description when taken in connection with the accompanying drawings.

In the drawings, wherein like numerals are employed to designate like parts throughout the same:

The procedure contemplated by this invention is, as mentioned, essentially a "field" operation. That is, it is capable of being performed by a relatively unskilled person and without the use of special apparatus, at the actual place of installation or during transit.

It involves first venting the space between the sheets to allow the air pressure enclosed within said space to become equal to that of the atmosphere and then permanently sealing the vent water vapor tight to restore the sealed dead air space enclosed between the sheets.

The air space between the glass sheets of the unit is vented by the provision of an opening through the metal separator strip of said unit. The seal for said opening is applied in a simple but no less novel manner. In fact, it is by virtue of the simplicity of the sealing operation, as well as the permanency of the water vapor tight seal, that the unit itself may be prepared for higher altitudes in the "field."

To be more specific, the procedure contemplated by this invention involves drilling an opening, of a size to accommodate a self-threading screw for subsequently filling the same, in the metal separator strip of a glazing unit of the type described, and thus permitting the air pressure inside the air space between the sheets of the unit to become equal to that of the atmosphere at the situs. When this balance is reached, the self-threading screw aforementioned is inserted and threaded its entire length into the opening to close the same, and a small drop of solder then applied to the head of the screw and permitted to cover and surround the same so as to seal the opening water vapor tight.

Figure 1:
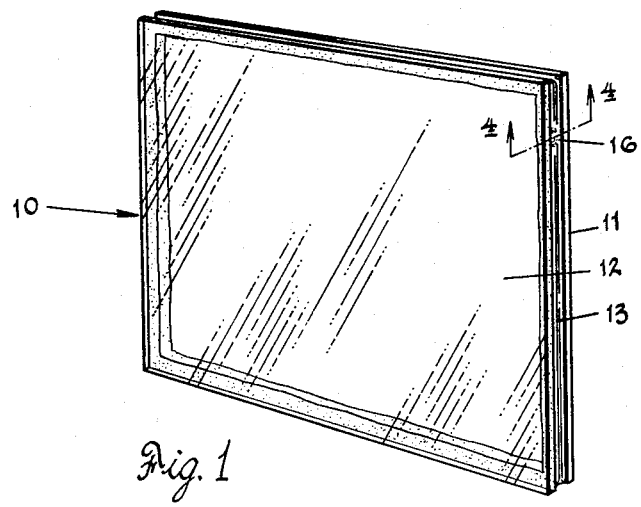
Fig. 1 is a perspective view of a multiple sheet glazing unit of the type described.

Referring now particularly to the drawings, there is shown in Fig. 1 an hermetically sealed multiple sheet glazing unit of the type described and designated in its entirety by the numeral 10. This unit comprises two sheets of glass 11 and 12 which are held in fixed spaced relation by thin separator strips 13 of lead or other suitable metal. The strips 13 are disposed between metallic coatings (not shown) on the inner margins of the sheets entirely therearound and the edges of said strips may be permanently joined to the metallic coatings by a suitable solder 14, in the manner disclosed, for example, in Patent No. 2,235,681 to C. D. Haven et al. The enclosed air space 15 between the sheets 11 and 12 has been dehydrated in any suitable manner through a dehydration hole in one of the separator strips, which is shown at 16 as having been hermetically sealed.

The unit 10, shown in Fig. 1 and described above, represents then a factory-assembled article having an hermetically sealed air space 15 of a pressure corresponding to that of the situs of assembly. As previously mentioned, under normal conditions such pressure is atmospheric and will cause outward bowing of the sheets 11 and 12 if the unit is installed or otherwise removed to areas of high altitude. The change in altitude which will, under normal circumstances, cause distortion depends principally on the size of the unit. Generally, however, this change may be said to be in the vicinity of 5000 feet.

Figures 2, 3:
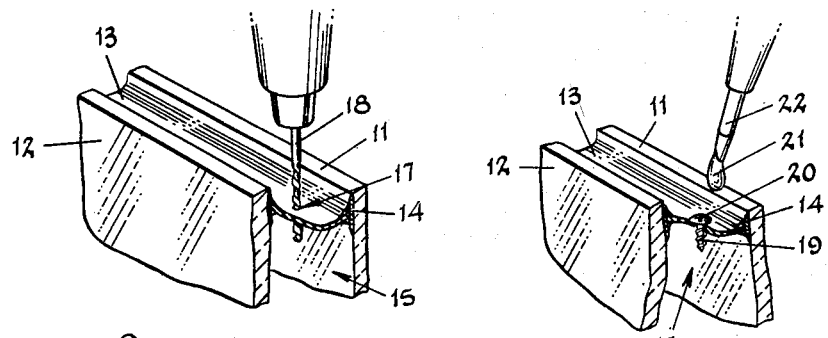
Fig. 2 is a fragmentary perspective view of a margin of the unit showing an opening being drilled in the metal separator strip thereof.
Fig. 3 is a view similar to Fig. 2 showing a drop of solder being applied to a self-threading screw in the opening.

According to this invention, in the "field" an opening 17 may be drilled or punched through one of the separator strips 13 by an awl 18, as shown in Fig. 2, of a diameter corresponding to that of a self-threading screw 19 to be inserted therein. At this time, the air in space 15 may be vented to the atmosphere at the place of installation and the pressure within said space permitted to equalize with that of the atmosphere.

Under most circumstances, a pressure equilibrium may be obtained without accumulating objectionable moisture within the space 15 by merely allowing the opening 17 to remain uncovered for a short length of time. In this respect, it will be understood that a perfect equilibrium is not absolutely essential inasmuch as the principal aim of the venting of the air space is to relieve the high pressure within said space. However, if a more exacting measurement be desired, a suitable air flow indicator may be used to determine when the air within the space 15 ceases to escape. A relatively inexpensive indicator which has proven satisfactory for this purpose is a product manufactured by the F. W. Dwyer Manufacturing Company of Chicago, Illinois, and called the "Visi-Float" air filter gage.

When the desired equilibrium has been obtained, the self-threading screw 19 may be forced into the opening 17 by a center punch or other similar type of tool until it assumes a position as shown in Fig. 3 in which the head 20 thereof abuts against the outer face of separator strip 13. It will thus be seen that this self-threading screw constitutes a solid body or plug which fits tightly into the opening 17 to fill the same. This then provides a seal for opening 17 which is sufficiently tight to prevent a flux from entering the space 15 when subsequently applied to the strip preparatory to the application of a drop of solder 21, as shown in Fig. 3, large enough to entirely cover the head 20 of the screw. As well, the seal is sufficiently tight to prevent the solder from dropping into the space.

Figure 4:
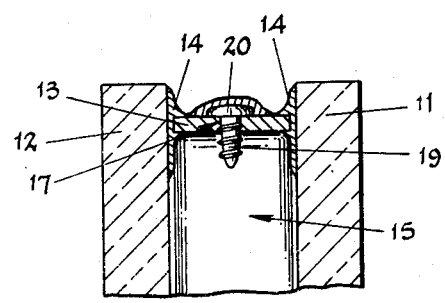
Fig. 4 is a sectional view taken substantially along line 4—4 of Fig. 1 showing the sealed opening.

The drop of solder 21 may be applied over the head 20 of the screw by a commercial type soldering iron 22 of 100 watts capacity, which will supply adequate heat without the danger of burning a hole through the strip 13. It is important that the tip of the iron 22 be of small diameter to avoid excessively heating the bond 14 and thereby adversely affecting the joinder of strip 13 to the glass sheets 11 and 12. As shown in Fig. 4, the solder entirely covers the head 20 of the screw and, upon hardening, forms a permanent, water vapor type seal for opening 17.

A test of the above described "field" method of sealing was performed by having three different individuals seal approximately 50 openings in multiple sheet glazing units of the type shown, and, without exception the openings were found to be tightly sealed.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:
1. The method of establishing pressure equilibrium between the internal areas and external areas of a hermetically sealed multiple sheet glazing unit to accommodate for changes in pressure externally of the unit, comprising hermetically sealing spaced sheets of glass together so as to enclose an insulating medium in the space between the sheets at a presusre substantially equal to the pressure existing externally of the unit, then upon a change in external pressure on the unit, venting the hermetically sealed space between said sheets to the atmosphere existing externally of the unit to allow the pressure within said space to at least approximately assume that of the external pressure, and subsequently sealing said vent to again hermetically seal said space between said sheets at a pressure substantially equal to that then existing externally of the unit.

2. The method of establishing pressure equilibrium between the internal areas and external areas of a hermetically sealed multiple sheet glazing unit which are initially sealed under low altitude conditions and later moved to higher altitudes, which comprises upon moving said multiple sheet glazing unit to higher altitudes where lower atmospheric pressures exist, venting the hermetically sealed space between the sheets to the higher altitude atmosphere to allow the pressure within said space to at least approximately assume the external pressure of the higher altitude, and subsequently filling said vent with a solid body to again hermetically seal said space between said sheets at a pressure substantially equal to that existing at said higher altitude.

3. The method of establishing pressure equilibrium between the internal areas and external areas of a multiple sheet glazing unit having a hermetically sealed space enclosed by glass sheets and marginal separator strips to accommodate for changes in pressure externally of the unit, which comprises sealing the sheets of glass to the separator strip to form an enclosed hermetically sealed space between the sheets at a pressure substantially equal to the pressure existing externally of the unit, and upon a change in external pressure on the unit, forming an opening through a separator strip, and sealing said opening water vapor tight when the pressure within the space has approximately assumed that of the changed external pressure by first closing the opening with a self-threading screw and then sealing the same with a covering of solder over said screw and surrounding portions of said separator strip.

References Cited in the file of this patent
UNITED STATES PATENTS

| | | |
|---|---|---|
| 1,126,838 | Nichols | Feb. 2, 1915 |
| 1,592,609 | Mattice | July 13, 1926 |
| 1,650,144 | Mattice | Nov. 22, 1927 |
| 2,011,484 | Harman | Aug. 13, 1935 |
| 2,145,168 | Flagg | Jan. 24, 1939 |
| 2,235,681 | Haven et al. | Mar. 18, 1941 |
| 2,265,352 | Corbin | Dec. 9, 1941 |
| 2,326,455 | Gray | Aug. 10, 1943 |
| 2,508,079 | Spahn | May 16, 1950 |
| 2,512,426 | Hartley | June 20, 1950 |
| 2,621,397 | Black | Dec. 16, 1952 |